United States Patent
Ciccarelli et al.

(10) Patent No.: US 7,475,990 B2
(45) Date of Patent: Jan. 13, 2009

(54) METHOD OF CONTROLLING PORTABLE MEDIA PLAYERS SPEAKER AND VIDEO IMAGE

(75) Inventors: James A. Ciccarelli, Farmington Hills, MI (US); Robert J. Burnham, Novi, MI (US); George J. DeHelian, Jr., Roseville, MI (US); John A. Mecca, Oakland Township, MI (US); Ken Bloom, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 715 days.

(21) Appl. No.: 11/064,180

(22) Filed: Feb. 23, 2005

(65) Prior Publication Data

US 2006/0190969 A1    Aug. 24, 2006

(51) Int. Cl.
G03B 21/00 (2006.01)
G03B 21/22 (2006.01)
G03B 31/00 (2006.01)
H04N 5/64 (2006.01)
H04N 7/18 (2006.01)

(52) U.S. Cl. .............................. 353/13; 353/15; 353/18; 348/837; 701/28; 725/75

(58) Field of Classification Search ................... 353/13, 353/15, 18, 74, 79, 119, 122; 348/118, 837; 701/28; 710/62; 725/75
See application file for complete search history.

(56) References Cited

U.S. PATENT DOCUMENTS 6,330,337 B1   12/2001   Nicholson et al. ............. 381/86
6,443,574 B1    9/2002   Howell et al. ................. 353/13

*Primary Examiner*—Rochelle-Ann J Blackman
(74) *Attorney, Agent, or Firm*—Brinks Hofer Gilson & Lione

(57) ABSTRACT

A removable vehicle entertainment system is provided. The system includes a video display screen for displaying entertainment to an occupant of the vehicle. The system can be removed from the docking bracket in the vehicle, and attached to an external docking station such that the system can be used independently of the power supply and speakers of the vehicle. Further, the system can be used as a self-contained personal entertainment system. The system includes mechanical and/or electrical componentry that determines audio mute and video display configuration based on a power signal and a docked signal.

20 Claims, 3 Drawing Sheets

METHOD OF CONTROLLING PORTABLE MEDIA PLAYERS SPEAKER AND VIDEO IMAGE

BACKGROUND

1. Field of the Invention

The present invention relates to in-vehicle entertainment devices. More specifically, the present invention relates to removable entertainment devices that can be used as a stand alone device, and used in a vehicle docking bracket.

2. Description of Related Art

Recent advances have allowed for the incorporation of video entertainment systems into vehicles. Roof mounted video screens provide an example of such an entertainment system. Typically, the video screen is stored in a housing that is secured to the roof of the vehicle and can be flipped downward when an occupant of the vehicle desires to view the screen. The system displays images from an attached videocassette drive or other device onto the video screen, allowing vehicle occupants to view prerecorded video inside the vehicle.

The owners of such vehicles may have similar video equipment attached to a home entertainment system or may even have a portable entertainment system for use away from the home and outside of the vehicle. Consequently, the in-vehicle video entertainment system can be duplicative of other equipment possessed by the vehicle owner. This results in increased entertainment expenses for the vehicle owner.

If a typical portable entertainment system were configured to flip down from the roof similar to integrated entertainment systems, the video image would need to be inverted, such that, it would appear upright from the vantage point of the passenger. Further, it may be preferable to listen to the audio portion of the entertainment system through the integrated vehicle audio system. Accordingly, a method and interface must be provided to configure the audio and video parameters of the entertainment system.

In view of the above, it is apparent that there exists a need for an improved portable entertainment device.

SUMMARY

In satisfying the above need, as well as overcoming the enumerated drawbacks and other limitations of the related art, the present invention provides an improved portable entertainment device.

The present invention provides an in-vehicle entertainment system that can be removed from the vehicle. The system is secured in the vehicle by a vehicle docking bracket attached to the vehicle, preferably to the roof of the vehicle. Thus, when in the vehicle, a video display screen preferably extends downward from the housing of the system. When removed from the vehicle, however, downward extension of the video display screen can make viewing images on the screen difficult. Positioning the system such that the video display screen extends upward from the housing when removed from the vehicle docking bracket facilitates use of the system outside of the vehicle.

To avoid the display of upside down images on the video display screen, electronics of the system are able to display images in at least two orientations. A first orientation presents the image in a manner suitable for use in the vehicle, i.e., when the screen extends downward from the housing. A second orientation presents the image in a manner suitable for use outside of the vehicle, i.e., when the screen extends upward from the housing. A signal is generated indicating is the system is docked in the vehicle docking bracket and the image is displayed accordingly.

Further, the system enables or disables the internal speakers of the device based on the power signal provided by the docking station. Accordingly, when the portable entertainment device is docked in the vehicle docking bracket and the vehicle is in a RUN or ACCESSORY mode, the internal speakers will be muted and audio will be provided to the vehicle speakers through the vehicle audio system. Alternatively, when the vehicle power is OFF, or the portable entertainment device is undocked, the internal speakers are enabled to provide audio to the passengers. Therefore, the system enables or disables the internal speakers based on the power signal.

Further objects, features and advantages of this invention will become readily apparent to persons skilled in the art after a review of the following description, with reference to the drawings and claims that are appended to and form a part of this specification.

DETAILED DESCRIPTION

The following description of preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
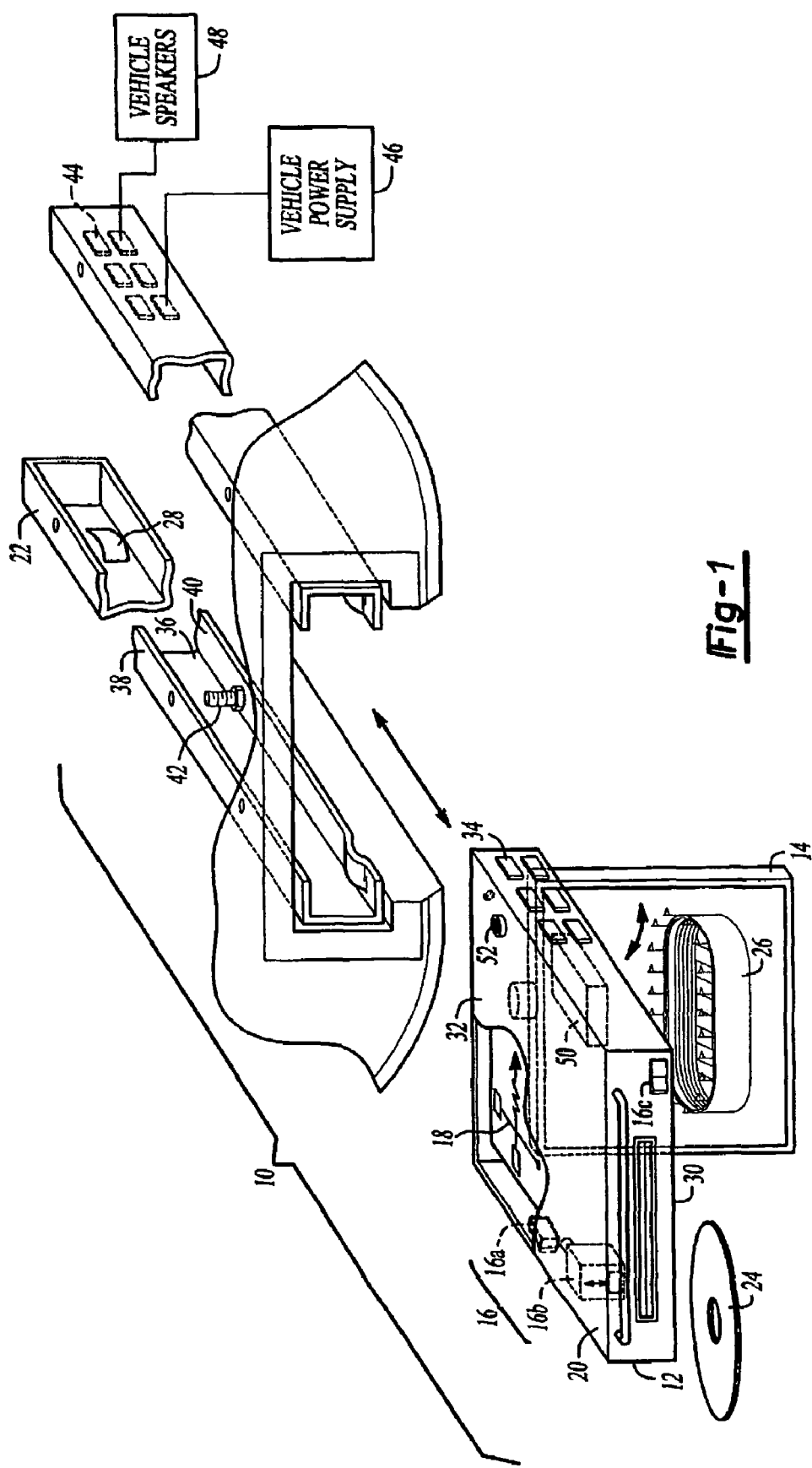
FIG. 1 is a perspective view of a first preferred embodiment of a removable entertainment device in accordance with the present invention.

FIG. 1 illustrates a removable entertainment device, generally indicated in the figures at reference 10, in accordance with a first preferred embodiment of the present invention. The removable entertainment device 10 includes an information retrieval device 12, a video display screen 14, a mechanical switch 16, electronics 18, a housing unit 20, and at least one vehicle docking bracket 22. The video display screen 14 is preferably pivotally mounted to the housing 20 such that the display screen 14 can be pivoted away from the housing 20 when viewing is desired and toward the housing 20 when storage of the screen 14 is desired. The vehicle docking bracket 22 releasably receives the housing unit 20.

The information retrieval device 12 is preferably a component that is capable of receiving a removable storage medium 24 and reading entertainment information stored on the medium 24. Particularly preferable, the information retrieval device 12 comprises a component capable of receiving and reading a standard type of storage media. As illustrated in the figure, the information retrieval device 12 preferably comprises a DVD (digital video disk) drive. In this embodiment, the removable or fixed storage medium 24 comprises a DVD. Alternatively, the information retrieval device 12 can comprise a compact disk (CD) drive, a CD-ROM drive, a removable or fixed hard drive, a videocassette drive, or any other suitable component. The removable storage medium 24 will of course be appropriate for the type of information retrieval device 12 utilized.

The video display screen 14 comprises the video output device of the removable entertainment device 10. As such, the screen 14 displays images 26 based on information contained on the removable storage medium 24 as read by the information retrieval device 12. The type of video display screen 14 employed will depend on the desired resolution and picture quality. LCD screens, such as those used in portable computers and personal entertainment systems, are suitable.

Because a portion of the entertainment device 10 can be removed from the vehicle docking bracket 22, it is not necessary that the device 10 always be used in an orientation in which the screen 14 extends down from the housing unit 20. While this orientation will of course be desirable when the entertainment device 10 is positioned within the vehicle docking bracket 22, it will most likely not be desirable when the device 10 is removed from the bracket 22. Rather, a reverse orientation in which the screen 14 extends upward from the housing unit 20 is desired in this instance. To avoid the display of the image 26 in an upside down orientation, the removable entertainment device 10 includes mechanical switch 16.

The mechanical switch 16 provides an actuator that indicates if the removable entertainment device 10 is docked in the vehicle docking bracket 22 and, in conjunction with the electronics 18, controls the orientation of the image 26 on the video display screen 14. The mechanical switch 16 preferably comprises a two position switch 16a. The first position represents an activated status, while the second position represents an inactivated status. Any suitable mechanical switch can be utilized. FIG. 1 illustrates two alternatives for the mechanical switch 16a, 16b. Preferably, the mechanical switch 16a is positioned such that it interacts with a projection 28 on the vehicle docking bracket. In this embodiment, projection 28 forces the switch 16a into the first position, or activated status, when the housing unit 20 is fully received by the vehicle docking bracket 22. As will be developed more fully below, the activated status of the switch 16 in this embodiment instructs the electronics 18 to display the image 26 on the video display screen 14 in an orientation appropriate for the screen 14 as it extends downward from the housing unit 20. When the housing unit 20 is removed from the vehicle docking bracket 22, the projection 28 forces the switch 16a into the second position, or inactivated status, which instructs the electronics 18 to display the image 26 on the screen 14 in an orientation appropriate for the screen 14 as it extends upward from the housing unit 20.

Alternatively, the switch 16 can comprise a gravity switch 16b. Any suitable gravity or tilt activated switch can comprise the gravity switch. U.S. Pat. No. 5,136,127 to Blair for a TILT ACTUATED SWITCH provides background and examples of suitable switches. In this embodiment, the gravity switch 16b is positioned such that it is able to detect the orientation of a first surface 30 of the housing unit 20 with respect to gravitational forces. Preferably, the gravity switch 16b is positioned such that the switch 16b is in the first position, or activated status, when the first surface 30 is facing downward. That is, it is preferred that the gravity switch 16b is positioned such that the switch 16b is activated when the removable entertainment device 10 is positioned such that the video display screen 14 extends downward from the housing 20 when viewing of the image 26 is desired, such as when the housing 20 is received by the vehicle docking bracket 22. Also preferable, the gravity switch 16b is positioned such that the switch 16b is in the second position, or unactivated status, when a second surface 32, which lies opposite the first surface 30, is facing downward.

Alternatively, the switch 16 can comprise a button 16c or other control that allows an occupant of the vehicle to manually activate switch 16. For example, as illustrated in FIG. 1, the switch can comprise a button 16c positioned on the housing unit 20 that allows a vehicle occupant to control activation of the switch 16, and therefore orientation of the image 26, by depressing the button 16c.

The electronics 18 are adapted to read the information stored on the removable storage medium 24 and to display an image 26 based on this information onto the video display screen 14. As such, suitable electronics 18 include those typically utilized in the type of information retrieval device 12 employed in the removable entertainment device 10.

Electronics 18 are further adapted to display the image 26 onto the video display screen 14 in at least two different orientations. Preferably, each orientation represents a 180 degree rotation of the other orientation. As discussed above, the electronics 18 preferably detect the status of the switch 16 to determine which orientation is appropriate for display on the screen 14.

Electronics 18 also preferably include terminals 34 that allow the electronics 18 to interact with external electrical components, which will be developed more fully below.

The housing unit 20 contains the information retrieval device 12 and the electronics 18. Preferably, the housing unit 20 encases the information retrieval device 12 and electronics 18 while still allowing the information retrieval device 12 to receive a removable storage medium 24 and the terminals 34 of the electronics 18 to interact with external electrical components. Further, the housing unit 20 preferably mounts the video display screen 14 in a manner that allows the screen 14 to pivot between first and second positions. In the first position, the screen 14 is preferably positioned directly adjacent the housing 20 such that the image 26 cannot be viewed on the screen. In a second position, the screen 14 is preferably positioned substantially perpendicular to the length of the housing 20 such that the image 26 can be optimally viewed. Any suitable structural interaction between the housing 20 and video display screen 14 that achieves this pivotal relationship can be utilized.

The vehicle docking bracket 22 is able to releasably receive the housing unit 20. Preferably, as illustrated in FIG. 1, the vehicle docking bracket 22 comprises a rail structure having a base 36 and two opposing arms 38, 40. In this embodiment, the opposing arms 38, 40 cooperatively receive and retain the housing unit 20 by allowing the housing unit 20 to slide between the arms 38, 40. Alternatively, the vehicle docking bracket 22 can comprise any structure capable of releasably receiving the housing unit 20.

The vehicle docking bracket 22 also preferably contains fasteners 42 for attaching the bracket 22 to the vehicle, such as at the roof or ceiling of the vehicle.

As illustrated in FIG. 1, the vehicle docking bracket 22 preferably defines one or more electrical connectors 44 that are in electrical communication with at least a power supply 46 and, either directly or indirectly, one or more speakers 48 of the vehicle. Preferably, the electrical connectors 44 comprise conductive flanges defined by the docking bracket 22. Alternatively, the electrical connectors 44 can comprise terminals of a pigtail connector or other suitable connector passed through an opening defined by the bracket 22.

Preferably, the electrical connectors 44 are positioned such that they are able to frictionally engage the terminals 34 of the electronics 18 as the housing unit 20 is received by the vehicle docking bracket 22. Also preferable, the electrical connectors 44 and terminals 34 are in electrical communication with each other, thereby placing the electronics 18 in electrical communication with the power supply 46 and vehicle audio system 48, when the housing unit 20 is fully received by the vehicle docking bracket 22.

When the housing unit 20 is not seated in the vehicle docking bracket 22, the removable entertainment device 10 is preferably capable of acting as a self contained entertainment device. Accordingly, the removable entertainment device 10 can further include an internal power supply 50 and an audio output component 52. The internal power supply 50 can comprise any suitable power supply, such as a rechargeable battery. Also, the audio output component 52 can comprise any suitable audio output device, such as a wired ready jack or wireless headphone transmitter, an internal speaker, or a speaker jack.

To accommodate use of the removable entertainment device 10 while docked, the audio output component 52 is muted or disabled and an audio is provided to the vehicle audio system through the electrical terminals 34. The audio component is muted based on a power signal provided to the removable entertainment device 10 by the docking bracket 22 through the electrical terminals 34. Accordingly, the inversion of the video image and muting of the audio output component 52 are independently controlled. Further, the video inversion and audio muting may be controlled by discrete signals such as binary signals, although, more complex forms of communication are also contemplated.

Using independent signals to control video inversion and audio muting allows the electronics 18 to mute the internal audio component 52 and invert the video image based on the vehicle power mode. The RUN vehicle mode is when the key is positioned such that the vehicle engine is running or may be started. The ACCESSORY mode is when the key is position such that the vehicle engine is off and cannot be started but battery power is provided to the vehicle subsystems. The OFF mode is where the key is removed or may be removed and vehicle subsystems are generally not powered. With advances in vehicle control systems these modes may also be simulated without regard to the position of the key switch. For example the vehicle controller may be programmed to enter ACCESSORY mode for a predetermined time period after the doors are unlocked.

The electronics 18 mutes the internal audio component 52 and inverts the video image in both a RUN and ACCESSORY vehicle power mode. When the vehicle is in the OFF mode and the station is docked, the electronics will still invert the video image, but will provide audio through the audio output device 52. Alternatively, when the housing 20 is undocked, the video image will not be inverted and audio will be provided through the audio output component 52 for portable operation. A table of operation for video inversion and audio muting is provided below in Table 1.

TABLE 1

Video Invert and Audio Mute Table

| Vehicle Power Mode | Player Mode | Power Signal | Docked Signal (Switch) | Video Mode | Audio Mode |
| --- | --- | --- | --- | --- | --- |
| RUN | DOCKED | VBATT | Logic "0" | Invert | Muted |
| ACCY | DOCKED | VBATT | Logic "0" | Invert | Muted |
| OFF | DOCKED | 0 | Logic "0" | Invert | Un-muted |
| X | UNDOCKED | 0 | Logic "1" | Normal | Un-muted |

Figure 2:
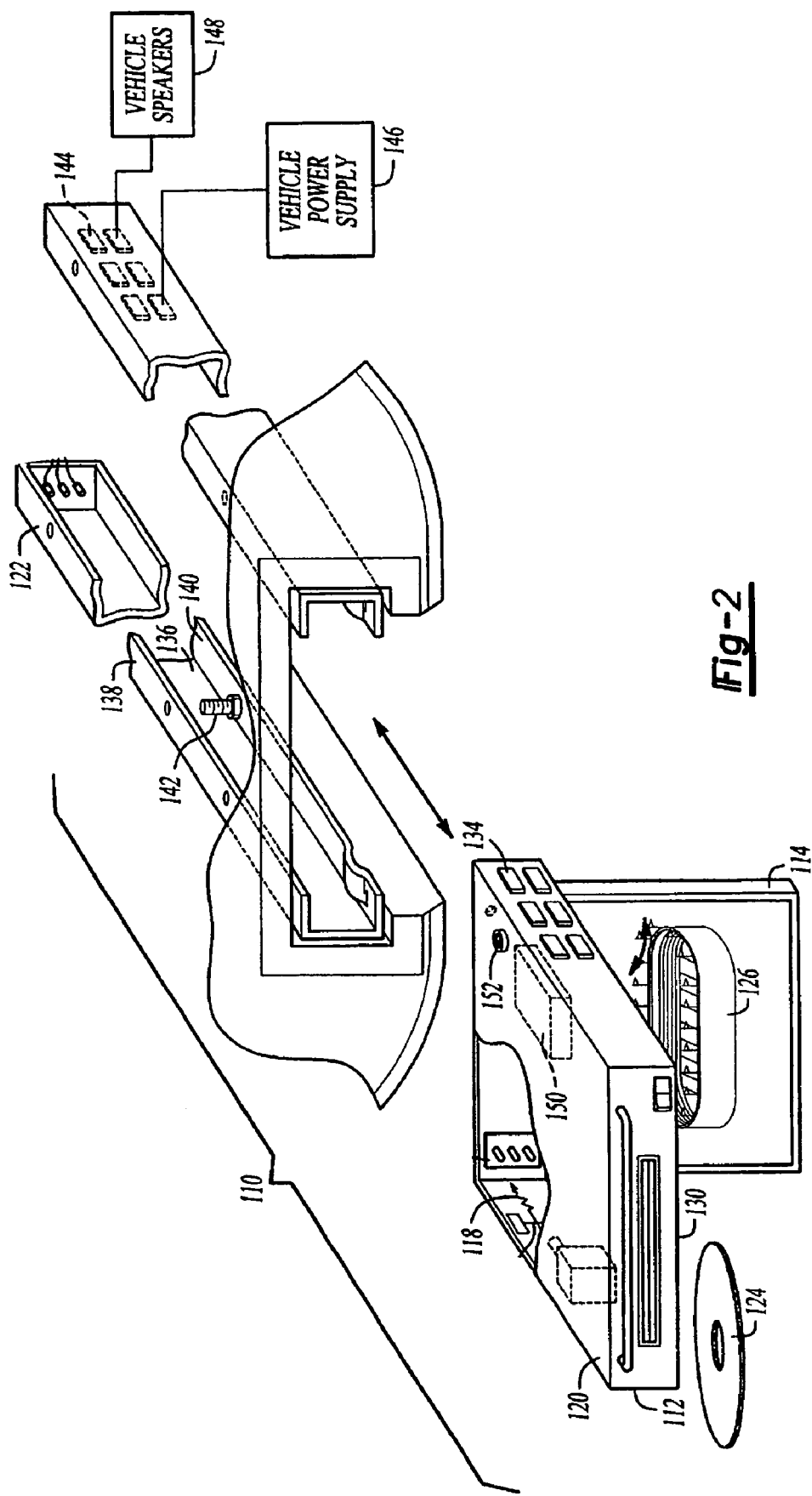
FIG. 2 is a perspective view of a second preferred embodiment of a removable entertainment device in accordance with the present invention.

FIG. 2 illustrates a second preferred embodiment of the present invention. In the figure, like reference numbers refer to similar features and/or components illustrated in FIG. 1. Accordingly, removable entertainment device 110 according to this embodiment includes an information retrieval device 112, a video display screen 114, electronics 118, a housing unit 120, a vehicle docking bracket 122, a removable storage medium 124, a first surface 130, a second surface 132, and electronic terminals 134. The bracket 122 preferably includes rail structures having a base 136 and two opposing arms 138,140. Fasteners 142 are used to attach bracket 122 to a vehicle. One or more electrical connectors 144 are in electrical communication with at least a power supply 146 and, either directly or indirectly, one or more speakers 148 of the vehicle. The removable entertainment device 110 may also include an internal power supply 150 and an audio output component 152. Also, the second preferred embodiment is similar to the first preferred embodiment detailed above, except as described below.

The removable entertainment device 110 according to the second preferred embodiment does not include a mechanical switch. Rather, the device 110 includes electronics 118 that detect whether the housing unit 120 is received by the vehicle docking bracket 122.

The vehicle docking bracket 122 includes electrical connectors 144 to interact with electronic terminals 134 in communication with electronics 118. The pins 162 are preferably in electrical communication with a power supply and provide an electrical signal to the electronics 118 when the electrical terminals 134 are in contact with the electrical connectors 144. When a docked signal is provided to the electronics 118, the electronics 118 preferably display the image 126 in an orientation appropriate for use with the vehicle docking bracket 122, as described above. When either no signal or an alternate signal is detected, the electronics 118 preferably display the image 126 in an opposite orientation.

The electronics 118 also determines the voltage of the power supply to which the removable entertainment device 110 is connected. In this embodiment, the electronics 118 preferably determines whether the removable entertainment device 110 is connected to a power supply appropriate for a vehicle. For example, in an automobile, the electronics 118 preferably determines if the removable entertainment device 110 is connected to a 12 V automotive battery. If such voltage is present, the electronics 118 mutes the audio output device 152. If a different voltage is detected, the electronics 118 provides audio through the audio output device 152.

Figure 3:
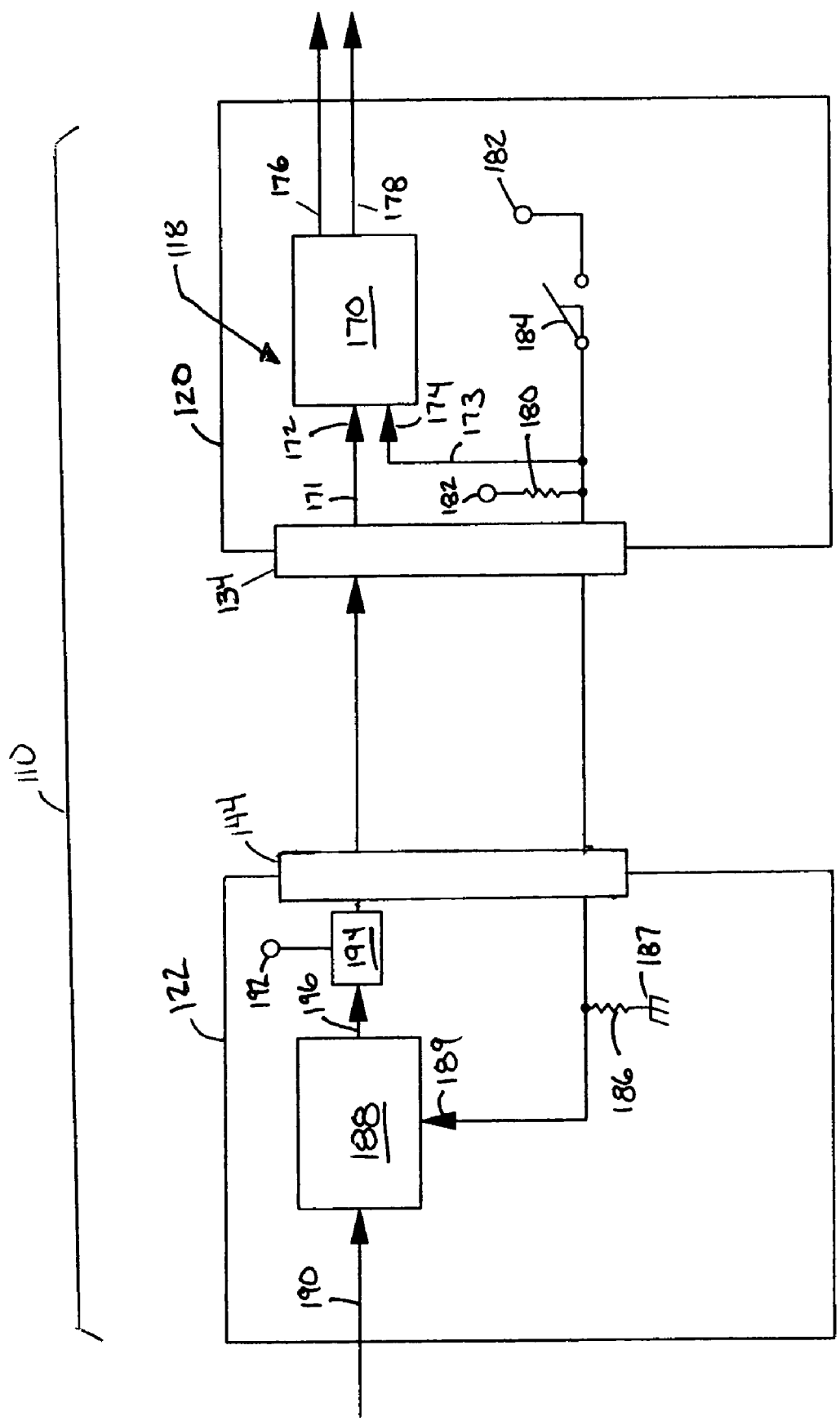
FIG. 3 is a block diagram of a circuit for controlling audio muting and video inversion in accordance with the present invention.

Now referring to FIG. 3, a block diagram of the circuitry for controlling the audio muting and video inversion is provided. The removable entertainment device 110 has electronics 118 including a microprocessor 170. The microprocessor 170 has a power signal input 172 and a docked signal input 174. Based on the power signal 171 received by the power signal input 172 and the docked signal 173 received by dock signal input 174, the controller 170 generates an inverted video signal 176 and an audio mute signal 178. The control of the inverted video signal 176 and the audio mute signal 178 are controlled in accordance with Table 1 provided above. The docked signal input 174 is connected to a microcontroller 188 in the docking bracket 122 through electronic terminals 134 and electrical connectors 144. The controller 188 has a player supported input 189 that can be used as part of a safety interlock system. The player supported input 189 is connected to ground 187 through a resistor 186, such as a 2K ohm resistor, in the docking bracket 122. Further, the player supported input 189 is connected to resistor 180 through electronic terminals 134 and connectors 144. Resistor 180, for example an 80K ohm resistor, pulls the docked signal input 174 to a reference voltage, such as 3.3 volts, from power source 182. When the screen is open, switch 184 is open and therefore the player supported input 189 is isolated from the power supply 182. Alternatively, if the screen is closed, the player support input 189 is connected to power supply 182 providing a reference voltage to the player supported input 189 that can be used as a safety interlock. When the screen is opened and the player is not docked, the voltage of the docked signal 173 is the reference voltage and is interpreted as a logic high by the microcontroller 170. Therefore, the microcontroller 170 controls the inverted video signal 176 such that the video image is not inverted. When the housing 120 is docked, the voltage of the docked signal 173 is pulled to an intermediate voltage by resister 186 and another reference voltage, shown as ground 187. The intermediate voltage is approximately 0.13 volts for a 3.3 volt reference based on the example resistances provided above. The intermediate signal is interpreted as a logic low by the microcontroller 170, causing the microcontroller 170 to control the inverted video signal 176 to invert the video image. Further, it should be noted that docked signal input 174 is pulled high, 3.3 volts, when switch 184 is actuated. Since the video screen 114 is closed when the switch 184 is actuated, the video is turned off therefore the video inversion is irrelevant.

To control audio muting, a RUN/ACCESSORY signal is provided to a RUN/ACCESSORY input 190 of the microcontroller 188. If the RUN/ACCESSORY signal indicates the vehicle is in a RUN or ACCESSORY mode, the controller 188 provides a power enable signal 196 that controls a high side switch 194. The high side switch 194 connects the battery voltage 192 to the power signal input 172, through electronic terminals 134 and electrical connectors 144, when the vehicle is in a RUN or ACCESSORY mode. When the power signal input 172 is connected to the battery voltage 192, the controller 170 controls the audio mute signal 178 to disable any internal speakers.

The schematic as described in FIG. 3 implements a control strategy consistent with Table 1 as provided above. Therefore, the video image 126 is inverted and the audio output device 152 are muted during RUN and ACCESSORY modes. However, in a key off or undocked condition the audio output device 152, such as speakers, are un-muted allowing the passenger to hear and view DVD movies while the vehicle is OFF.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. An entertainment system for use in a vehicle, the entertainment system comprising:
   a housing including a video screen, electronics, and an audio output device;
   a docking station configured to receive the housing;
   wherein the electronics is configured to mute the audio output device based on a vehicle power signal.

2. The entertainment system according to claim 1, wherein the electronics are configured to mute the audio output device when the vehicle is in a RUN mode.

3. The entertainment system according to claim 1, wherein the electronics are configured to mute the audio output device when the vehicle is in an ACCESSORY mode.

4. The entertainment system according to claim 1, wherein the audio output device includes at least one speaker.

5. The entertainment system according to claim 1, wherein the electronics are configured to mute the audio output device based on the vehicle power signal and a docked signal.

6. The entertainment system according to claim 5, wherein the vehicle docked signal is provided by a mechanical switch attached to the housing.

7. The entertainment system according to claim 5, wherein the electronics include a controller, and the docked signal is received by a docked signal input of the controller.

8. The entertainment system according to claim 7, wherein the docked signal input is connected to a first reference voltage through a first resistor in the housing.

9. The entertainment system according to claim 8, wherein the docked signal input is in communication with a second reference voltage through a second resistor in the docking bracket.

10. The entertainment system according to claim 9, wherein the docking station includes a docking controller and is configured to disable the power signal based on docked signal.

11. The entertainment system according to claim 1, wherein the electronics include a controller configured to invert an image on the video screen based on the docking signal.

12. The entertainment system according to claim 1, wherein the electronics are configured to provide audio through the audio output device when housing is not received in the docking bracket.

13. The entertainment system according to claim 1, wherein the docking bracket includes a docking controller configured to receive a RUN/ACCESSORY signal and connect the electronics to a vehicle battery voltage based on the RUN/ACCESSORY signal.

14. An entertainment system for use in a vehicle, the entertainment system comprising:
   a housing including a video screen, electronics, and an audio output device;
   a docking station configured to receive the housing;
   wherein the electronics is configured to mute the audio output device based on a vehicle power signal; and
   wherein the electronics are configured to provide audio through the audio output device when the vehicle is in an OFF mode and the housing is received in the docking bracket.

15. An entertainment system for use in a vehicle, the entertainment system comprising:
   a housing including a video screen, electronics, and a speaker;
   a docking station configured to receive the housing;
   wherein the electronics include a controller configured to mute the speaker based on a vehicle power signal and a docked signal and invert an image on the video screen based on the docking signal.

16. The entertainment system according to claim 15, wherein the electronics are configured to mute the speaker when the vehicle is in a RUN and ACCESSORY mode.

17. The entertainment system according to claim 15, wherein the electronics are configured to provide audio through the speaker when the vehicle is in an OFF mode and the housing is received in the docking bracket.

18. The entertainment system according to claim 15, wherein the vehicle docked signal is provided by a mechanical switch attached to the housing.

19. The entertainment system according to claim 15, wherein the controller includes a docked signal input and the docked signal input is connected to a first reference voltage through a first resistor.

20. The entertainment system according to claim 19, wherein the docked signal input is in communication with a second reference voltage through a second resistor.

* * * * *